(12) United States Patent
Kamo et al.

(10) Patent No.: US 7,855,032 B2
(45) Date of Patent: Dec. 21, 2010

(54) FUEL CELL

(75) Inventors: Tomoichi Kamo, Naka (JP); Kenichi Souma, Mito (JP)

(73) Assignee: Hitachi, Ltd., Tokyo (JP)

( * ) Notice: Subject to any disclaimer, the term of this patent is extended or adjusted under 35 U.S.C. 154(b) by 1243 days.

(21) Appl. No.: 11/357,025

(22) Filed: Feb. 21, 2006

(65) Prior Publication Data
US 2007/0072037 A1   Mar. 29, 2007

(30) Foreign Application Priority Data
Sep. 28, 2005   (JP) ............................. 2005-281846

(51) Int. Cl.
*H01M 8/04* (2006.01)
*H01M 8/10* (2006.01)
(52) U.S. Cl. .................. 429/513; 429/479; 429/512
(58) Field of Classification Search ............ 429/30, 429/34
See application file for complete search history.

(56) References Cited

U.S. PATENT DOCUMENTS

2002/0127451 A1 *   9/2002   Cao et al. ............... 429/30

FOREIGN PATENT DOCUMENTS

JP   2000-268835   9/2000

* cited by examiner

*Primary Examiner*—Emily M Le
*Assistant Examiner*—Jared Wood
(74) *Attorney, Agent, or Firm*—Antonelli, Terry, Stout & Kraus, LLP.

(57) ABSTRACT

The present invention provides a fuel cell having an anode to oxidize liquid fuel, a cathode to reduce oxygen, and a solid polymer electrolyte membrane formed between said anode and said cathode, wherein: a porous body, which faces the porous anode, having continuous micro pores which form a liquid fuel feed channel by capillary force and continuous micro pores which do not have liquid retentivity is used; and the liquid fuel is supplied by the capillary negative pressure generated at the anode.

9 Claims, 8 Drawing Sheets

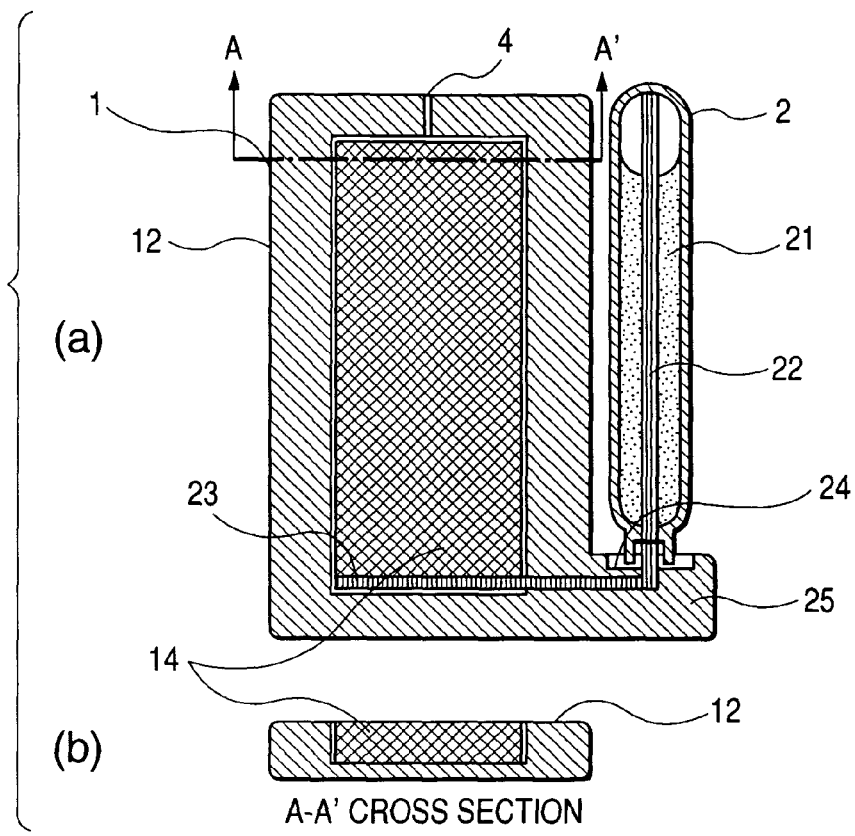
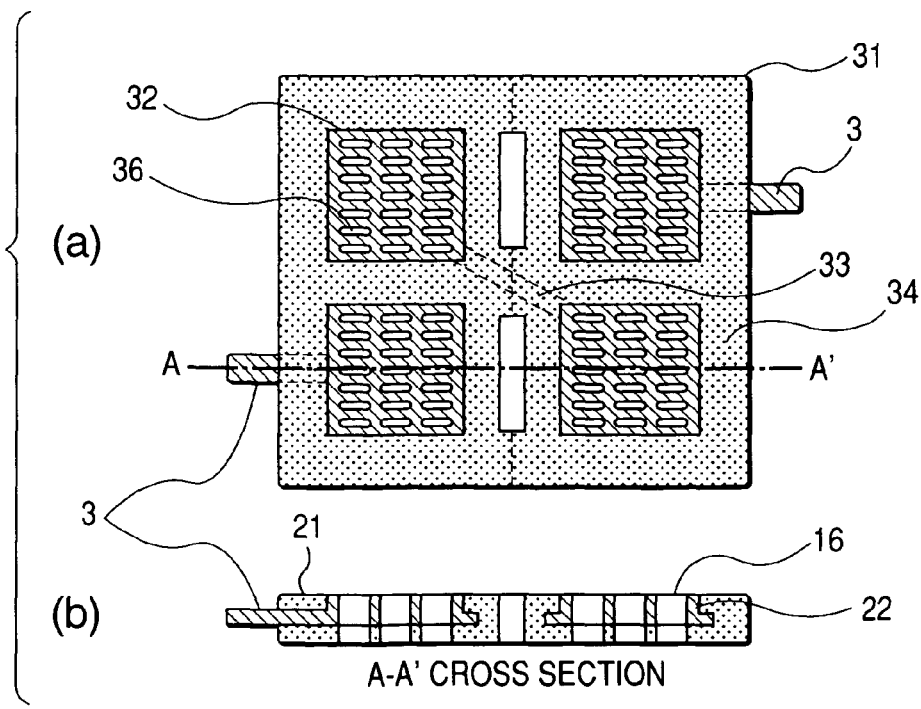

A-A' CROSS SECTION

A-A' CROSS SECTION

B-B' CROSS SECTION

A-A' CROSS SECTION

B-B' CROSS SECTION

A-A' CROSS SECTION

A-A' CROSS SECTION

A-A' CROSS SECTION

FUEL CELL

CLAIM OF PRIORITY

The present application claims priority from Japanese application serial No. 2005-281846, filed on Sep. 28, 2005, the content of which is hereby incorporated by reference into this application.

FIELD OF THE INVENTION

A polymer electrolyte membrane fuel cell (PEM-FC) power generation system generally comprises: a battery produced by connecting battery modules, each of which is formed by disposing a porous anode and a porous cathode on both the surfaces of a solid polymer electrolyte membrane, in series or, if required, in parallel; a fuel container; a fuel feed system; and an air or oxygen feed system. In order to use a fuel cell such as a DMFC which uses liquid fuel as a portable device power source in particular: efforts have been exercised in achieving higher performance of an electrode catalyst and an electrode structure and developing a solid polymer membrane of little fuel crossover (penetration) with the aim of realizing a battery having a higher output density; and further a state-of-the-art technology for the downsizing of a fuel pump and an air blower and a system which does not require auxiliary power including a fuel feed pump and an air feed blower have also been researched. With regard to a power generation mechanism which reduces or does not require such auxiliary power, JP-A No. 268835/2000 discloses a so-called passive-type power source which does not require liquid fuel transport power.

The object of the present invention is to provide a liquid fuel direct-type fuel cell which, when the fuel cell power source is mounted on a portable IT device or a portable device or used as a secondary battery charging source for a portable device: A) does not require auxiliary power for fuel feed; B) allows operation in any position; C) can feed fuel with simple handling; D) reduces cross leak and crossover of liquid fuel; E) secures a high output density and a high energy density; and F) realizes high degrees of safety and reliability.

SUMMARY OF THE INVENTION

The present inventors have devoted themselves to studying the problems of the aforementioned prior art in order to surmount them and, as a result, have invented a fuel feed system capable of operating in any position described below and a fuel cell power source system using the fuel feed system. That is, the present invention is a fuel cell having an anode to oxidize liquid fuel, a cathode to reduce oxygen, and a solid polymer electrolyte membrane formed between the anode and the cathode, wherein: a porous body, which faces the porous anode, having continuous micro pores which form a liquid fuel feed channel by capillary force and continuous micro pores which do not have liquid retentivity is used; and the liquid fuel is supplied by the capillary negative pressure generated at the anode. Further, the development challenges are solved preferably by realizing a fuel cell having an anode to oxidize liquid fuel, a cathode to reduce oxygen, and a solid polymer electrolyte membrane formed between the anode and the cathode, wherein the fuel cell has: a porous body, which faces the porous anode, having continuous micro pores which form a liquid fuel feed channel by capillary force and continuous micro pores which do not have liquid retentivity; and an air exchange section having capillary force.

The present invention, in a fuel cell directly using liquid as fuel, makes it possible to provide a fuel cell power source which does not require auxiliary power, allows operation in any position, can feed fuel with simple handling, is operable, and has high degrees of safety and reliability without fuel leakage by: using a porous material; forming a liquid fuel feed channel from a detachable fuel cartridge to the anode of a fuel cell power source by the capillary force of the porous material; and feeding the fuel by the capillary negative pressure generated by the fuel consumption caused by the power generation at the anode.

Further, it is possible to realize high performance battery operation without clogging caused by gas at an electrode reaction field, prevent pressure rise accompanying power generation at a suction section, and reduce the cross leak of liquid fuel by: composing a suction structure, which is used opposite an anode, of a structure part of continuous micro pores to transport liquid and the other structure part of continuous micro pores to transport gas components generated at the anode; and making the radius of the gas transport micro pores larger than that of the liquid transport micro pores. Furthermore, since the suction section has a binary pore structure as stated above, the substantial contact area of the liquid fuel to an MEA is reduced and hence it is possible to reduce the crossover of the fuel and operate at a high output density and a high energy density. In particular, the MEA can receive stable and uniform pressure over the full area for long periods by rendering elasticity to the material of the suction section and hence it is possible to reduce the internal resistance of the power source and increase the output of the power source.

Furthermore, it is possible to prevent liquid leakage from a fuel cell, eliminate the necessity of a complicated control means, and stably supply fuel from a fuel cartridge by disposing a porous air exchange section on the battery body and using it as a bubble pressure barrier.

In addition, it is possible to exhaust the gas generated in the vicinity of an anode without liquid leakage by forming plural pinholes on the wall surface of a fuel cell which contains a suction section facing an anode and further it is possible to suppress air diffusion from the exterior of the fuel cell and minimize the deterioration of the performance of the anode by reducing the opening area of the pinholes to the necessity minimum. Furthermore, it is possible to prevent fuel from leaking out even when a fuel cell power source according to the present invention undergoes a strong impact by sealing the pinholes with a porous gas-liquid separation membrane.

BRIEF DESCRIPTION OF THE DRAWINGS

FIG. 3 comprises sectional views showing an example of the structure of a fuel cell according to the present invention.

FIG. 4 comprises a plan view and a sectional view showing the structure of a complex collector used in the present invention.

DETAILED DESCRIPTION OF THE PREFERRED EMBODIMENTS

Figure 1:
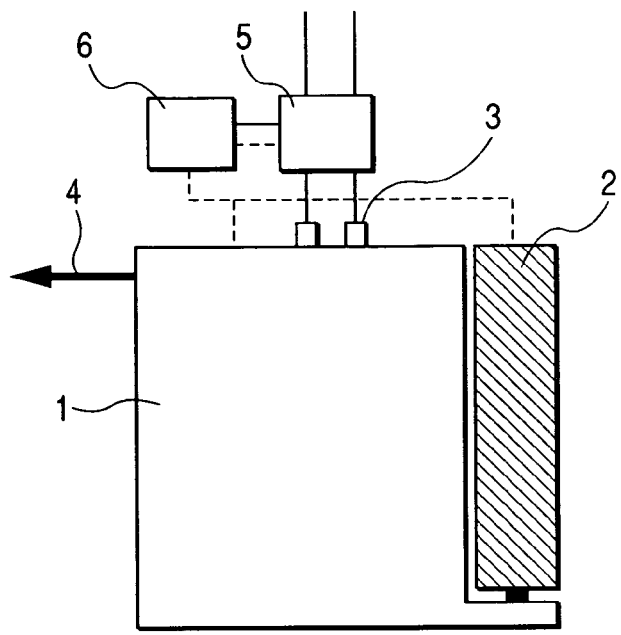
FIG. 1 is a view showing the structure of a fuel cell power generation system according to the present invention.

Embodiments according to the present invention are hereunder explained but the present invention is not limited to the embodiments explained below.

In a fuel cell of the present embodiment which uses methanol as the liquid fuel, the chemical energy of methanol is directly converted into electrical energy by the electrochemical reaction shown below and thus electricity is generated. On the side of an anode, the supplied methanol aqueous solution reacts in accordance with the expression (1) and dissociates into carbon dioxide gas, hydrogen ions and electrons.

$$CH_3OH + H_2O \rightarrow CO_2 + 6H^+ + 6e^- \quad (1).$$

The generated hydrogen ions move from the anode to the cathode side in an electrolyte membrane, react with oxygen gas diffusively coming from air and electrons on the cathode in accordance with the expression (2), and generate water.

$$6H^+ + 3/2O_2 + 6e^- \rightarrow 3H_2O \quad (2).$$

That is, in the overall chemical reaction accompanying power generation, as shown by the expression (3), methanol is oxidized by oxygen and thus carbon dioxide gas and water are generated. The chemical reaction formula is identical to that of flaming combustion.

$$CH_3OH + 3/2O_2 \rightarrow CO_2 + 3H_2O \quad (3).$$

The open circuit voltage of a battery module is about 1.2 V and substantially 0.85 to 1.0 V by the influence of the permeation of fuel into an electrolyte membrane. Though it is not particularly limited, practical voltage under load operation is selected from the range of about 0.2 to 0.6 V. Hence, when the battery module is actually used as a power source, serially connected battery modules are used so that a prescribed voltage may be obtained in accordance with the requirement of a load device. The output current density of a battery module varies by the influence of an electrode catalyst, an electrode structure and others but the battery module is designed so as to obtain a prescribed electric current by effectively selecting the area of the power generating section of the battery module. Further, it is possible to adjust the battery capacity by properly connecting the battery modules in parallel.

Examples of fuel cells according to the present embodiment are hereunder explained in detail.

FIG. 1 shows the structure of a power source system according to the present example. The power source system is provided with: a fuel cell 1; a fuel cartridge 2; output terminals 3; and an exhaust pinhole 4. With regard to battery output, the method of supplying electric power to a load device through a DC/DC converter 5 is adopted. The power source system comprises the above components and a controller 6 which is designed so as to: receive signals concerning the fuel cell 1, the remaining fuel amount of the fuel cartridge tank 2 and the state at the time of the operation or stop of the DC/DC converter 5 and others; control the DC/DC converter 5; and output warning signals according to need. Further, the controller 6 can: display the operation state of the power source including battery voltage, output current, battery temperature and others on the load device when necessary; and, when the remaining amount of the fuel cartridge tank 2 is lower than a prescribed level or when the diffused air amount of the cathode side or the like deviates from a prescribed range, stop the power supply from the DC/DC converter 5 to the load and drive a malfunction alarm by acoustics, voice, a pilot lamp or literal display. In normal operation too, the controller 6 can receive the signals of the remaining fuel amount of the fuel cartridge tank 2 and display the remaining fuel amount on the load device.

Figure 2:
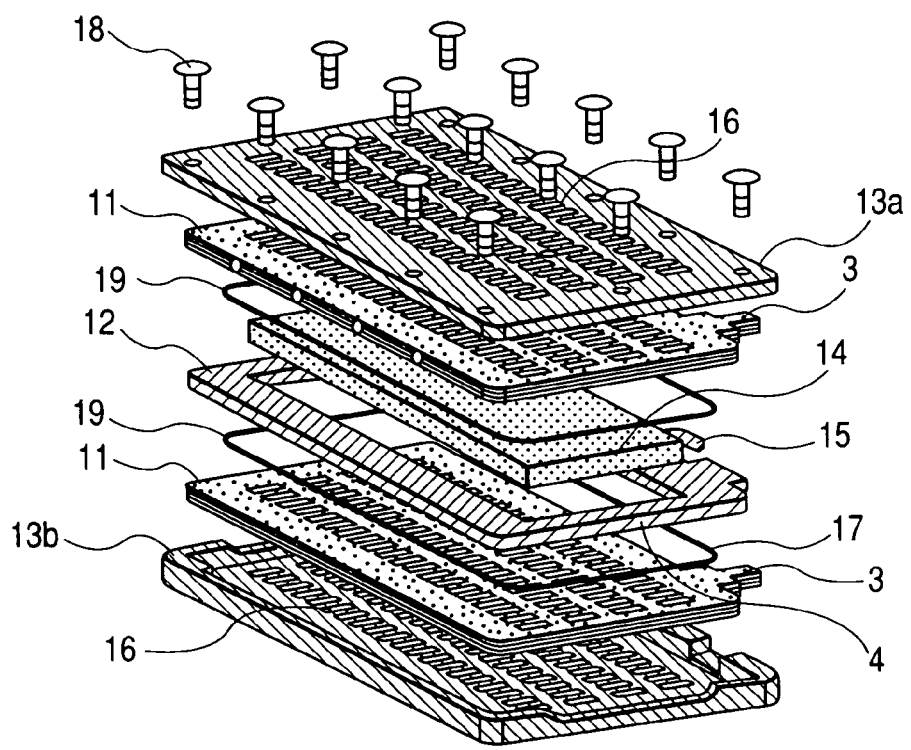
FIG. 2 is a schematic view showing the laminated structure of a fuel cell according to the present invention.

FIG. 2 shows the structure of the components of a fuel cell as an example according to the present invention. A fuel retentive section of the fuel cell comprises a fuel chamber frame 12 and a liquid fuel suction structure 14 contained therein. On one side thereof, a power generation device 11 formed by integrating a current collector, an output terminal 3 and an MEA (membrane electrode assembly) is held by a cathode end plate 13*a* in an interposed manner and the fuel retentive section and the power generation device 11 are sealed with a gasket 19. Further, on the other side of the fuel retentive section, a similar power generation device 11 is held by another cathode end plate 13*b* having a chassis function in an interposed manner and the power generation device 11 and the fuel retentive section are sealed with another gasket 19. Then, the whole structure is constructed by mounting and tightening all the components with screws 18 so that the pressure in the planes is equalized. The fuel chamber frame 12 is provided with a transport center core 15 and a gas exhaust pinhole 4.

Cathode slits 16 for air diffusion synchronizing with those formed on the cathode surfaces of the power generation devices 11 are formed on the surfaces of the cathode end plates 13*a* and 13*b*. Meanwhile, though they are not shown in the figure, anode slits 17 for fuel supply are formed on the anode surfaces of the power generation devices 11 and liquid fuel supplied to and retained in the liquid fuel suction structure 14 is supplied to the anodes by capillary force.

FIG. 3 shows the outline of the fuel feed system comprising the fuel chamber frame 12 having the liquid fuel suction structure 14 according to the present invention, wherein (a) is a plane view and (b) is a cross sectional view. The liquid fuel suction structure 14 is contained in the fuel chamber frame 12, a cartridge connector 25 is disposed on the frame body, and the fuel cartridge 2 which has a fuel transport center core 22 and is filled with liquid fuel 21 is mounted on the cartridge connector25. The cartridge connector 25 is configured so that a transport center core 23 connected to the fuel suction structure 14 has a male-type connector structure so as to be connected to the fuel transport center core 22 in the fuel cartridge 2. The cartridge connector 25 has an air hole 24 and the transport center core 23 and the air hole 24 compose an air exchange section which adjusts negative pressure in the fuel cartridge 2 generated in accordance with fuel supply and stabilizes fuel supply. That is, when liquid fuel is supplied from the inside of the fuel cartridge 2 due to the fuel consumption of the anode, the pressure in the fuel cartridge becomes negative and it becomes impossible before long to supply fuel due to the negative pressure if no measure is taken. In this case, the capillary force of the transport center core 23 which has sealed the air hole 24 for preventing the intrusion of air is destroyed by the negative pressure in the cartridge, the air is supplied to the interior of the fuel cartridge through the transport center core 23 and the fuel transport center core 22, and thus the state of the negative pressure is dissolved. As a result, the pressure in the cartridge is recovered to a level of allowing the supply again and stable fuel supply is continued. Though the example of disposing the air exchange section on the cartridge connector 25 of the fuel cell is shown here, the gist of the present invention is not limited to this and includes a fuel feed system wherein an air exchange section is disposed on a fuel cartridge 2 as described later. Further, the fuel chamber frame 12 has one or more exhaust pinholes 4 and they have the function of exhausting the gas generated in the fuel chamber.

The basic configuration of a fuel feed system comprises: an anode capillary tube connected to a fuel suction material; a capillary tube of a suction structure 14; and a capillary tube of an air exchange section comprising a transport center core and an air hole. Then, those components form a continuous liquid fuel feed channel and the fuel in a fuel cartridge is transported by the capillary negative pressure generated with the fuel consumption at an anode. Here, when the following expression is satisfied in the case where the surfaces of the capillary tube materials are hydrophilic, $$P_F \leq P_C < P_A,$$

where, $P_A$ represents the capillary force of an anode, $P_C$ the capillary force of a suction portion, and $P_F$ the capillary force of an air exchange section, the liquid fuel contained in the fuel cartridge is absorbed in the transport center core 23 composing the air exchange section, the absorbed liquid fuel moves to the fuel suction structure 14 having a stronger capillary force and further moves to the micro pores of the anode, and thus a continuous fuel feed channel is formed. Further, even when the capillary force of the air exchange section is substantially the same as that of the fuel suction structure 14, the continuous fuel feed channel is formed. Here, each of the capillary forces $P_F$, $P_C$, and $P_A$ is defined as an equilibrium suction height measured by immersing the lower part of a relevant porous structure body into liquid fuel. When a continuous liquid feed channel is formed with the fine holes of those members, the fuel is transported by the negative capillary force generated in accordance with the consumption, caused by power generation, of the liquid fuel in the capillary tube of the anode. In this case, the material of the fuel transport center core 22 disposed in the fuel cartridge is not particularly limited and may be any material as long as it has a capillary force identical to or lower than that of the transport center core 23 composing the air exchange section. When the fuel transport center core 22 is structured so as to pass through the interior of the cartridge as shown in FIG. 4, it is thereby possible to substantially use up the fully contained liquid fuel by the capillary force of the center core 22 even when the fuel cell is turned upside down from the position shown in the figure.

If this is seen from another standpoint, by selecting the contact angle $\theta_C$ between the porous structure and liquid fuel and an average pore radius $r_C$ so as to satisfy either or both of the following expressions;

$$\theta_F \geq \theta_C > \theta_A, \text{ and } r_F \geq r_C > r_A,$$

a continuous fuel feed channel is formed by the capillary force, where $\theta_F$ and $\theta_A$ represent the contact angle between an air exchange section material and liquid fuel and the contact angle between an anode material and liquid fuel, respectively, and $r_F$ and $r_A$ represent the average pore radius of an air exchange section and the average pore radius of an anode, respectively.

Next, the minimum requirement for not having fuel leakage caused by impact and the like from the exhaust pinhole 4 and the air hole 24 when the fuel cartridge 2 is detached from the fuel cell 1 is preferably that the capillary force $P_C$ of continuous pores forming the liquid fuel feed channel in the suction structure 14 is selected so as to satisfy the following expression;

$$P_O + \rho g h \leq P_C \leq P_A.$$

Here, $P_O$ represents a pressure imposed from outside such as impact and others, $\rho$ the viscosity of liquid fuel, g the gravity acceleration, h the head height of liquid fuel retained in the porous body, and $P_A$ the capillary force of the porous anode. Further, it is possible to prevent liquid leakage from a fuel cell caused by impact and others by controlling the average pore radius $r_C$ of continuous pores forming a liquid fuel feed channel so as to satisfy the following expression;

$$2\sigma \cos \theta_C/(P_O+\rho g h) \geq r_C \geq r_A(\cos \theta_C/\cos \theta_A).$$

Here, $\sigma$ represents the interfacial tension of liquid fuel, $\theta_C$ and $\theta_A$ the contact angle between a porous body and liquid fuel and the contact angle between an anode and liquid fuel respectively, and $r_A$ the average pore radius of the anode.

Further, the method of separating gas from liquid by sealing an exhaust pinhole 4 with a water-repellent porous film is a method effective for doubly preventing liquid leakage.

Next, the properties of the suction structure 14 used in a fuel cell according to the present invention are hereunder explained in detail. In a fuel chamber, it is necessary to exhaust carbon dioxide gas generated at an anode in accordance with power generation simultaneously with the supply of liquid fuel. Hence, the gist of the present invention is to realize: a binary structure comprising a group of continuous pores to transport fuel and a group of continuous pores having a relatively large radius in order to exhaust and transport vapor phase components generated in an anode chamber without clogging caused by the surface tension of liquid fuel or having water repellency; or a structure having the binary function of water-receptive pores and water-repellent pores.

In the above, the group of continuous micro pores involved in transferring the fuel are micro pores having liquid retentivity, and the micro pores having relatively a large radius are micro pores having no liquid retentivity. The liquid retentivity used in the specification is expressed by the following formula:

$$P \ll \rho g h$$

In the above, a capillary force is P, a viscosity of the fuel $\rho$, a gravity acceleration force g. and a head difference of the liquid fuel retained in the micro pores h.

An equation of capillary force is expressed as follows:

$$P = 2\sigma \cos \theta/r$$

In the above, a surface tension force is σ, a contact angle θ, and a micro pore size r. Accordingly, when the r is sufficiently large, P becomes nearly zero, which means the micro pores have no liquid retentivity. The minimum value of r depends on the materials of the micro pores, liquid fuel, etc.

The capillary force is determined by measuring an equilibrium height from the liquid face of the liquid sucked by the micro pores when immersing the bottom of the micro pore body in the liquid fuel. When the sucked height is h:

$$H = 4\sigma \cos\theta / \rho g r$$

From the equations of the capillary force and the sucked height, the capillary force is calculated.

By so doing, the vapor phase components generated in the anode chamber are exhausted from the exhaust pinhole 4 to outside of a battery through the relatively large continuous micro pores or the water-repellent continuous micro pores and liquid fuel is transported through the relatively small continuous micro pores or the water-receptive continuous micro pores.

Next, materials used for the fuel feed system according to the present invention are explained in detail. The material used for the suction structure 14 is not particularly limited as long as it is a material having stable strength as a structure, having resistance to corrosion under the battery environment, and not containing components soluble in methanol aqueous solution. The material for the fuel chamber frame is not particularly limited as long as it is a porous material having the properties, such as strength, corrosion resistance and others, as a part of the materials supporting the battery structure and hence it is possible to use a natural fiber material such as pulp, a porous material comprising polymer or the like, a porous material comprising synthetic fiber, a porous material comprising ceramics, metal or the like, and others.

In particular, a porous body of ceramics, an intermetallic compound or metal, which is expected to have a high rigidity, or a metallic porous body having a specific elasticity is an effective material. In this case, an anode generally comprises a material comprising carbon secondary particles and having micro pores 1 to 50 μm in radius and a material comprising primary particles and having micro pores several tens nanometers in radius, and hence, from the restrictive conditions related to the aforementioned average pore radius, the micro pores for fuel transport in the suction structure 14 are designed so as to have an average radius of 50 to 250 μm and in contrast the micro pores for gas transport therein are designed and formed so as to have an average radius of 500 μm or larger in order to avoid the clogging caused by the surface tension of the liquid fuel. It goes without saying that such pore radii are not univocally defined but are selected in relation to the contact angle between a suction material to be used and liquid fuel, and the viscosity of the liquid fuel.

Next, a material used for the transport center core 23 having the function of transporting fuel in the fuel cartridge 2 to the fuel suction structure 14 and the function of composing the air exchange section is not particularly limited as long as it is a material having stable strength as a structure, having resistance to corrosion under the battery environment, and not containing components soluble in methanol aqueous solution, and it is possible to use a natural fiber such as pulp, a porous material comprising polymer or the like, a porous material comprising synthetic fiber, a porous material comprising ceramics, metal or the like, and others.

In particular, it is said that the preferable materials compatible with such various kinds of structures are flexible materials such as: a material produced by bundling single yarn of polyethylene, polypropylene, polyester, or polyethylene terephthalate; a porous body comprising twisted yarn of natural fiber of cellulose including cotton yarn or synthetic fiber of nylon, Tetron, polyethylene, polypropylene, acryl, polyurethane, polyphenylene, polyester, or polyethylene terephthalate; and a foaming polymer material having continuous micro pores.

The center core serving the function of the air exchange section is designed and produced so that the average pore radius thereof is in the range from 50 to 500 μm. When the pore radius is less than 50 μm, the difference between the pore radius of the transport center core and that of the anode is small, the suction of the liquid fuel that accompanies fuel consumption is also small, and the resistance to the transportation becomes disadvantageously large. In contrast, when the pore radius exceeds 500 μm, it becomes difficult to continuously retain the liquid fuel in the micro pores, that causes liquid leakage, and it becomes impossible to transport the fuel. In this case too, it goes without saying that such a pore radius is not univocally defined but is selected in relation to the contact angle between the center core material to be used and liquid fuel, and the viscosity of the liquid fuel.

The material of the liquid fuel transport center core 22 used in the fuel cartridge may substantially be the same as the material of the aforementioned transport center core 23 used in the fuel chamber. However, it is not limited to the material and another material may be employed. In this case, by selecting the pore radius of the used liquid fuel transport center core 22 from inside the range of 50 to 500 μm so as to be the same as or larger than the pore radius of the transport center core 23, the liquid fuel in the cartridge is stably transported toward the anode.

As stated above, the fuel feed system of a fuel cell power source according to the present invention is characterized in that the fuel feed channel is formed by combining plural porous materials and the fuel feed system is configured so as to stably transport fuel by the capillary negative pressure generated in accordance with the fuel consumption accompanying power generation at the anode. It is an effective method, with the aim of preventing the transfer resistance of the liquid from increasing at joint surfaces when different kinds of porous materials are joined, to interpose a fibrous porous material that is excellent in flexibility, such as cellulose, polyethylene, polypropylene, polyester, polyurethane, or polyethylene terephthalate, or a spongy porous material made of high polymer, as an auxiliary transport material between the joint surfaces.

A material used for the fuel chamber frame 12 is not particularly limited as long as the material is substantially insulative and has strength sufficient for the support of the battery structure and corrosion resistance under the operation environment. However, it is preferable to use high density polyvinyl chloride, high density polyethylene, high density polypropylene, epoxy resin, polyether ether ketones, polyether sulphones, polycarbonate, or a material produced by reinforcing one of those with glass fiber. Further, it is possible to use a method of: using a carbon plate, a metal material of steel or nickel, alight weight metal material of titanium, aluminum or magnesium, an alloyed material thereof, an intermetallic compound represented by copper-aluminum or the like, or various kinds of stainless steels; and passivating the surface thereof or coating the surface with resin and insulating the material.

FIG. 4 shows the structure and configuration of a complex collector 31 composing a power generation device 11 according to the present invention, wherein (a) is a plane view and (b) is a cross sectional view. The complex collector 31 is structured so that plural conductive collector plates 32 having slits 36 thereon firmly adhere to a resin film 34 having slits 36 synchronizing with those of the collector plates 32, as shown in the sectional view taken on line A-A' of FIG. 4. Each of the collector plates is structured so that an interconnector 33 to serially connect plural MEAs disposed on the plane at the time of assembly and an output terminal 3 to supply electricity to outside are tightly embedded.

A material used for the collector plates 32 is not particularly limited. However, it is effective in enhancing the output density and securing the long-term performance stability of a battery to reduce the contact resistance at the time of implementation by applying corrosion-resistant noble metal plating or conductive carbon painting or the like to the electrically contact sites of a collector plate which is made of: carbon; a metal such as stainless steel, titanium or tantalum; an alloy of one or more of them and other metals; or a complex material such as a clad of one of the above metallic materials and another metal, for example, carbon steel, stainless steel, copper, nickel or the like.

A resin film 34 used for the complex collector 31 is not particularly limited as long as the resin film is stable under the power generation environment, is heat resistant, and has a certain degree of dimensional stability. Thus, it is possible to use polyvinyl chloride, polyethylene, polypropylene, polyimides, epoxy resin, polyether ketones, polyether sulphones, polycarbonate, or the like.

Figure 5A:
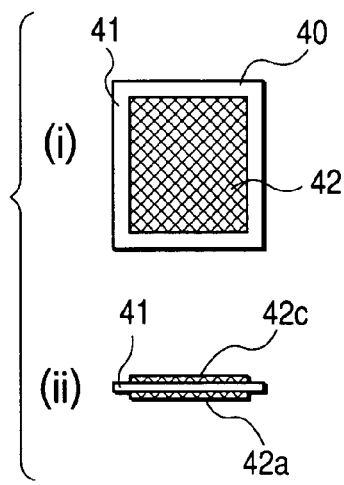
FIGS. 5(a), 5(b), and 5(c) are views showing the structures of an MEA and anode and cathode diffusion layers used in the present invention.

FIG. 5(a) shows a structure of an MEA 40 comprising plural components used in the present invention. To the MEA 40 comprising plural components, an anode 42a and a cathode 42c are connected as plural electrodes on both the respective surfaces of the electrolyte membrane 41.

Here, a material produced by dispersing and supporting fine particles of mixed metal of platinum and ruthenium or alloy of platinum and ruthenium in a carbonaceous powder carrier is easily producible and applicable to an anode catalyst composing the power generation section, and a material produced by dispersing and supporting fine particles of platinum in a carbonaceous carrier is easily producible and applicable to a cathode catalyst thereof. A preferable ratio of platinum, which is the main component of the catalyst, to the carbon powder is generally 50 wt % or less and it is possible to form an electrode showing high performance even when the ratio is 30 wt % or less by using a catalyst having high activity or improving the dispersion into the carbonaceous carrier. A preferable platinum amount in an electrode is 0.5 to 5 mg/cm$^2$ in the case of the anode 42a and 0.1 to 2 mg/cm$^2$ in the case of the cathode 42c.

However, the catalysts of the anode and cathode of a fuel cell according to the present invention are not limited to specific catalyst compositions as long as the materials are those used for a usual direct-type methanol fuel cell, and a catalyst of higher performance can reduce the amount of the catalyst more and thus is effective for the reduction of the cost of the power source system.

By using a hydrogen ion conductive material for the electrolyte membrane, a stable fuel cell can be produced without being influenced by the carbon dioxide gas in the atmospheric air. As such a material, it is possible to use: sulphonated fluorine system polymer represented by poly-perfluoro-styrenesulphonic acid, perfluoro-carbon system sulphonic acid or the like; a material produced by sulphonating hydrocarbon system polymer such as poly-styrenesulphonic acid, sulphonated polyether-sulphones, sulphonated polyether ether ketones or the like; or a material produced by alkyl-sulphonating the hydrocarbon system polymer.

By using such a material as the electrolyte membrane, it is generally possible to operate the fuel cell at a temperature of 80° C. or lower. Further, by using a complex electrolyte membrane produced by finely dispersing a hydrogen ion conductive inorganic material such as hydrated tungsten oxide, hydrated zirconium oxide hydrogen tin oxide or the like into heat-resistant resin or sulphonated resin, it is further possible to operate the fuel cell in a higher temperature range. In particular, sulphonated polyether-sulphones, sulphonated polyether ether sulphones, or a material of a complex electrolyte type using hydrogen ion conductive inorganic material is preferable to the poly-perfluoro-carbon sulphonic acids as an electrolyte membrane having low permeability of methanol in the fuel. In any of the cases, the power generation utilization ratio of fuel increases by using an electrolyte membrane having high hydrogen ion conductivity and low methanol permeability, and hence it is possible to attain the downsizing and long-term power generation which are the effects of the present example at higher levels.

An example of the method of producing an MEA according to the present invention is hereunder explained, but it is not particularly limited to the disclosed method. That is, the catalyst adjusted as stated above of 10 parts in weight is prepared by weighing and a binder which has been dissolved in an alcohol aqueous solution system solvent beforehand is added to the catalyst so that the binder amount is 4 to 7 parts in weight.

Ink for electrodes is produced from the mixed material with a ball mill, a mixer, a stirrer or the like. As the sulphonated resin used as the binder, it is preferable to use sulphonated resin having good bondability and compatibility with a used electrolyte membrane. As the method of bonding the prepared ink for electrodes to the electrolyte membrane, it is possible to adopt screen printing, splay coating, ink-jet coating, a transcription method with a roll process or the like. Those bonding methods are not particularly limited and, for each of the methods, the conditions, such as: the ink parameters of a solid material concentration, viscosity, dispersion and the like; temperature; drying speed; pressing pressure; and the like, are selected and adjusted so that an electron conduction network, an ion conduction network, the diffusion resistance of reactants and products which secure the highest utilization ratio of the electrode catalyst are formed in the microstructure of the electrodes.

Figure 5B:
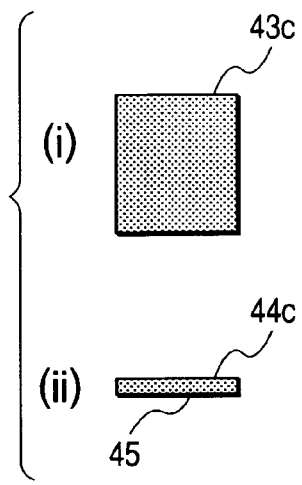
Figure 5C:
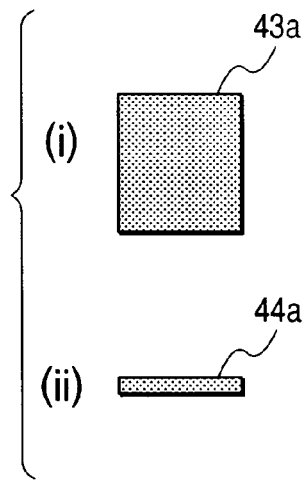

FIGS. 5(b) and 5(c) show the outlines of the structures of the cathode diffusion layer 43c and the anode diffusion layer 43a used in the present invention. The cathode diffusion layer 43c comprises a water-repellent layer 45 having intensified water-repellency and a substrate 44c and the water-repellent layer 45 is layered so as to touch the cathode 42c. The anode diffusion layer 43a comprises a substrate 44a and there is no specific regulation with regard to face contact-with the anode 42a.

As the substrates 44c and 44a of the cathode diffusion layer 43c and anode diffusion layer 43a, a conductive porous material is used. Carbon fiber cloth or fabric cloth is generally used. For example, as carbon fiber cloth, carbon cloth (Torayca Cloth made by TORAY) or carbon paper (TGP-H-060 made by TORAY) is used. The water-repellent layer 45 of the cathode diffusion layer 43c is formed by mixing carbon powder, water-repellent minute particles, water-repellent fibril or water-repellent fiber, for example polytetrafluoroethylene, and others.

More specifically, carbon paper (TGP-H-060 made by TORAY) is cut out into a piece of a prescribed size, the water absorption of the carbon paper is measured beforehand. Thereafter the carbon paper is immersed into polytetrafluorocarbon-water diffusion (D-1 made by Daikin Industries, Ltd.) diluted so that the weight percentage of the carbon paper after being baked is in the range from 20% to 60%, dried for about one hour at 120° C., and further baked for 0.5 to 1 hour at 270° C. to 360° C. in the air. Successively, polytetrafluorocarbon-water diffusion is added to carbon powder (XC-72R made by Cabot Corporation) so that the weight percentage is in the range of 10% to 60% and they are mixed.

The paste-formed mixture is applied on one surface of the water-repellent carbon paper so that the thickness is in the range from 10 to 30 μm. The coated carbon paper is dried for about one hour at 120° C. and thereafter baked for 0.5 to 1 hour at 270° C. to 360° C. in the air, and thus the cathode diffusion layer 43c is produced.

The air permeability and moisture permeability, namely the diffusibility of supplied oxygen and generated water, of the cathode diffusion layer 43c largely depend on the addition amount of polytetrafluoroethylene, diffusibility and baking temperature, and hence appropriate conditions are selected in consideration of the designed performance, service environment and others of the fuel cell.

As the anode diffusion layer 70, carbon fiber cloth or fabric cloth, which satisfies both electric conductivity and porosity, is preferably used. For example, as carbon fiber cloth, carbon cloth (Torayca Cloth made by TORAY) or carbon paper (TGP-H-060 made by TORAY) is preferably used. The function of the anode diffusion layer 43a is to accelerate the supply of aqueous solution fuel and the quick dispersion of generated carbon dioxide gas. Therefore, the aforementioned methods of dispersing water-receptive resin in a porous carbon plate and of using a strong water-receptive material represented by titanium oxide are methods effective in increasing the output density of the fuel cell. Further, the anode diffusion layer 43a is not limited to the above materials and a metallic material substantially electrochemically inert (for example, stainless steel fiber non-woven cloth, a porous body, porous titanium, tantalum and others) can also be used.

Figure 6:
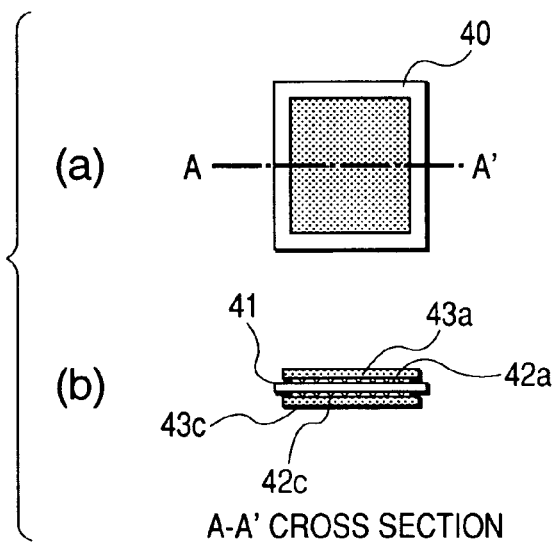
FIG. 6 comprises views showing a structure formed by integrating an MEA and diffusion layers used in the present invention.

FIG. 6 shows the configuration and sectional structure of an MEA comprising the MEA 40, the cathode diffusion layer 43c and the anode diffusion layer 43a prepared by the method disclosed above, wherein (a) is a plane view and (b) is a cross sectional view. The method of forming each of the diffusion layers by applying binder used for the preparation of the MEA to the periphery of the electrodes beforehand and integrating them by cold pressing or hot pressing is an effective method for improving productivity.

In the above explanations, the method of disposing diffusion layers after the electrode layers are joined to the electrolyte membrane is disclosed. However, not only the above method but also the method of applying anode catalyst and cathode catalyst to respective diffusion layers and joining them with the electrolyte membrane by hot pressing is effective. In particular, when the vicinity of room temperature is selected as the operation region of a fuel cell, the optimum electrode thickness increases in comparison with a high-temperature operation type fuel cell and hence it is said that the method is effective in the case of dispersing a water-repellent material also in the electrode layers.

Figure 7:
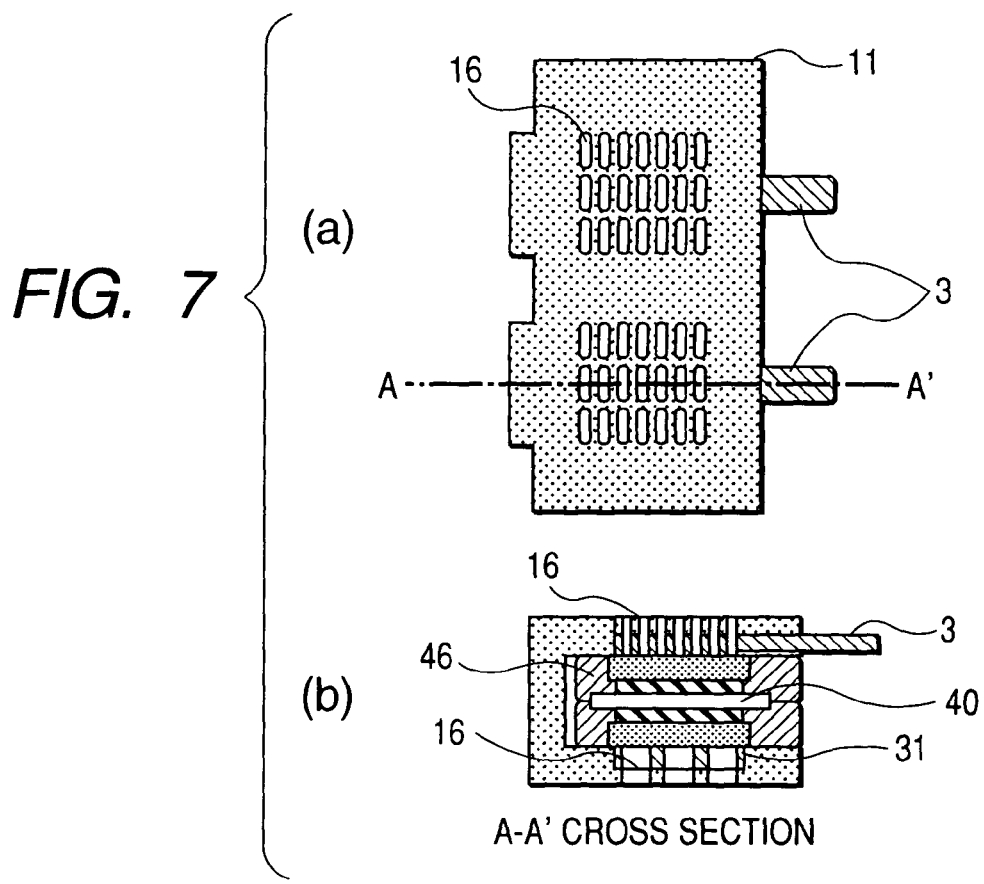
FIG. 7 comprises a plan view and a sectional view showing the structure of a power generation device used in the present invention.

FIG. 7 shows the appearance and sectional structure of a power generation device 11 prepared according to the present invention, wherein (a) is a plane view and (b) is a cross sectional view. The power generation device 11 is configured by the method wherein an MEA is disposed so as to touch one surface of a collector plate 32 in a flexible complex collector 31 formed by resin molding of collector plates 32, folding back the other collector plate 32 in the flexible complex collector plate 31, and interposing them with adhesive sealant 46.

The method is characterized in that the power generation device 11 is independently integrated as a structure which is formed by serially connecting the power generation sections comprising plural MEAs 40 and has output terminals sealed between the cathode and the anode. In this case, the sealant which interposes the electrolyte membrane forming the flange section of the MEA and joins the folded back surface of the flexible complex collector 31 is not particularly limited and any material is acceptable as long as it is a material which is electrochemically stable and does not substantially have solubility and swelling property to methanol, and thus a sheet of synthetic rubber or the like, a publicly known gasket material such as a kind of liquid sealant or the like is used.

In particular, a thermally adhesive sheet of a butyl rubber type having thermal adhesiveness has the characteristics of maintaining a high degree of planarity and fusing at a temperature of not damaging the electrolyte membrane and others and thus is a preferable material.

Figures 8A, 8B:
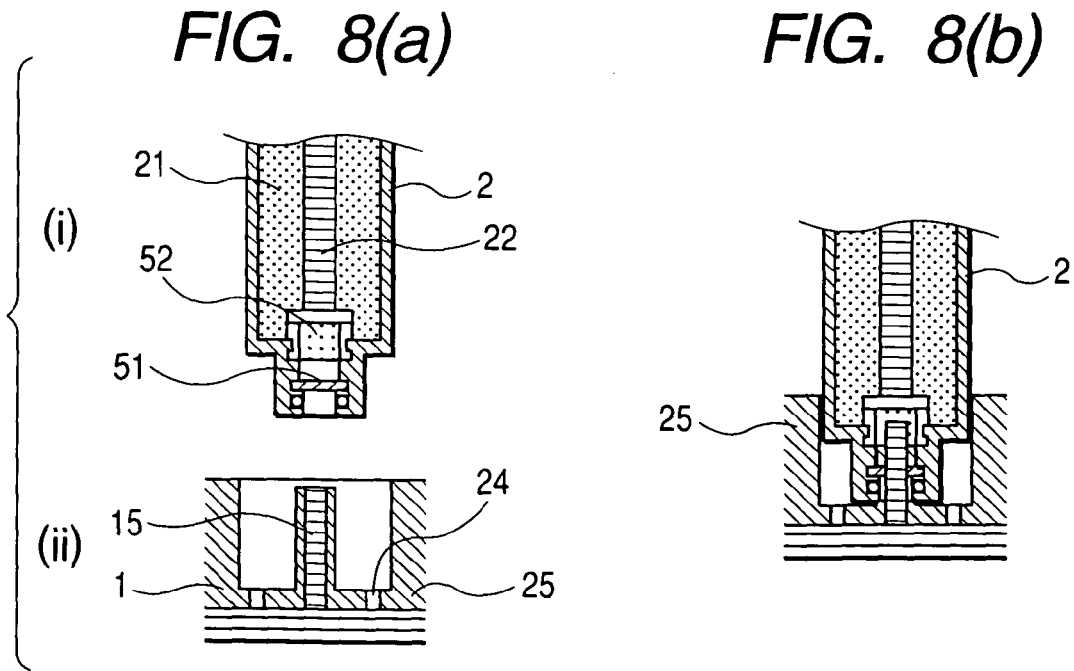
FIGS. 8(*a*) and 8(*b*) area sectional view and a sectional assembly view of a fuel cartridge connector according to the present invention.

FIG. 8(a) and (b) show the outline of the structures of the male connector of the cartridge connector 25 and the female connector of the fuel cartridge 2 which connect the fuel cell 1 to the fuel cartridge 2 according to the present invention, wherein (i) is a cross sectional view, (ii) a cross sectional view of a connector 25, and (iii) a connected status of the cartridge connector.

The cartridge connector 25 is formed at a part of the fuel chamber frame 12 of the fuel cell 1 and the fuel transport center core 15 contained in the case a part of which opens functions as the male connector. Further, at one or more portions of the cartridge connector 25, one or more of air holes 24 having air exchange function are disposed. Meanwhile, the female connector disposed on the side of the fuel cartridge comprises a fuel transport center core 22 and a slit valve 51 and the tip of the female connector is filled with an auxiliary transport material 52 to stabilize the joint with the transport center core 15 of the male connector on the side of the fuel cell. FIG. 8B shows the outline of the sectional structure wherein the fuel cartridge 2 is mounted on the fuel cell 1.

When the fuel cartridge 2 is inserted into the cartridge connector 25 for mounting, the male connector portion passes through the slit valve 51 and is connected to the fuel transport center core 22 through the auxiliary transport material 52 at the tip of the female connector in the cartridge and the fuel is fed to the fuel cell by the capillary negative pressure generated at the anode in accordance with the power generation of the battery. As a method of connecting the fuel cartridge 2 to the fuel cell 1, a generally used method can be used and no specific limitation is required. There are the methods of fixing the fuel cartridge 2 to the cartridge connector 25 with screws, with hooks, with a ratchet structure, and with other means.

The fuel cartridge is filled with methanol aqueous solution, which is fuel of a prescribed concentration. The fuel concentration varies in accordance with the nature of a used electrolyte membrane. That is, methanol aqueous solution of a relatively low concentration can be used in the case of a perfluorocarbon system membrane having large methanol crossover as represented by Nafion (made by DuPont) and methanol aqueous solution of a relatively high concentration can be used in the case of a hydrocarbon system sulphonic acid membrane. In the method of directly supplying liquid fuel in general, 3 to 10 wt % methanol aqueous solution can be used in the case of the perfluorocarbon system electrolyte membrane and 10 to 40 wt % methanol aqueous solution can be used in the case of the hydrocarbon system electrolyte membrane.

However, when a fuel feed system using the capillary force of a suction material according to the present invention is employed, the contact rate of the liquid fuel to the anode substantially decreases and hence it is possible to reduce the substantial crossover amount of methanol and water. As a result, even when operation is carried out while the fuel concentration is raised in comparison with the case of directly supplying liquid fuel, it is possible to operate without causing heat generation at the cathode based on the crossover, flooding of the cathode, and deterioration of the battery performance. For example, even when the concentration is increased up to maximum 25 wt % in the case of the perfluorocarbon system electrolyte membrane and up to maximum 40 wt % in the case of the hydrocarbon system electrolyte membrane, it becomes possible to operate stably.

Needless to say, when an electrolyte membrane having lower crossover is used, it becomes possible to operate directly with fuel of a still higher concentration. By the present invention, it is possible to increase the utilization ratio of fuel, operate with fuel of a higher concentration, increase the energy density of the used fuel, and increase the power source energy density per one time fuel fill, namely considerably prolong the power generation duration.

In the capillary transport according to the present invention, the fuel transport rate and the liquid leakage prevention effect are determined by the properties such as the material composing the capillary tubes, the pore radius and others. However, when fuel having a different methanol concentration is used, the surface tension, the solid-liquid contact angle, the liquid viscosity and others change in accordance with the methanol concentration and hence the transport rate of the capillary transport material, the liquid leakage prevention effect and others also change.

Therefore, the method of changing and adjusting the solid-liquid contact angle, the viscosity and others by adding an electrochemically inert material to the fuel liquid in order to secure the compatibility to fuel having a different concentration is an effective method. For example, in order to change the viscosity of fuel, it is preferable to add one or more kinds selected from among: ethylene glycol, heptanol, octanol and the like as higher alcohols; ribose, deoxyribose, glucose, fructose, galactose, sorbitol and the like as saccharides; methyl cellulose, ethyl cellulose, carboxymethyl cellulose and the like as cellulose ethers; and agar, gelatin and the like.

An addition amount is selected in accordance with the liquid viscosity to be set and a preferable addition amount is generally in the range from 0.1 to 1 mol %. The methanol aqueous solution to which the above material is added can be adjusted to have a desired viscosity and at the same time the osmotic pressure of the liquid fuel is raised, and hence it is possible to reduce the crossover of water and methanol and increase the fuel utilization ratio as secondary effects.

The method of dispersing colored solid minute particles in, namely adding pigment to, liquid fuel used in the present invention facilitates the identification of the fuel, the visual recognition of fuel remaining amount, the confirmation of fuel usage and others and is an effective method for securing the safety of the power generation system and the fuel feed system. It is also possible to color liquid fuel by adding dye or the like to it.

However in this case, there has been the fear that an electrode adsorbs the dye and causes poisoning since the dye dissolves in the liquid fuel or the deterioration of the fuel cell or the constituent materials is accelerated due to the elution of the components from the fuel cell constituent members. However, by dispersing colored solid minute particles, namely adding pigment, it is possible to improve safety without deteriorating the reliability of the fuel cell power source.

As pigments which can be added and is capable of coloring, listed are: C. I. Pigment Yellow 24, 101, 108, 109, 110, 117, 120, 123, 138, 139 and 135; C. I. Pigment Orange 2, 5, 17, 24, 31, 36, 38, 40 and 43; C. I. Pigment Red 1, 2, 3, 4, 5, 7, 9, 10, 12, 14, 15, 17, 18, 22, 23, 31, 48, 49, 50, 53, 57, 58, 60, 63, 64, 81, 83, 87, 112, 122, 123, 144, 146, 149, 166, 168, 170, 171, 175, 176, 177, 178, 179, 185, 187, 188, 198, 190, 192, 194, 208, 209, 216, 243 and 245; C. I. Pigment Violet 1, 3, 19, 23, 31, 32, 33, 36, 38, 49 and 50; C. I. Pigment Blue 1, 2, 15, 16, 22, 25 and 63; C. I. Pigment Green 8, 10, 12 and 47; C. I. Pigment Brown 1, 5, 25, 26 and 28; C. I. Pigment Black 1 and 7; and others. The color tone is not particularly limited but it is said that the use of the pigments of blue color group, namely the pigments of C. I. Pigment Blue group, gives beverages evading impression and thus is an effective means for giving warning and securing safety.

The embodiments of the present invention have been explained above and some examples most characteristic of the present invention are explained further in detail.

EXAMPLE 1

Structure of Battery

Figure 9:
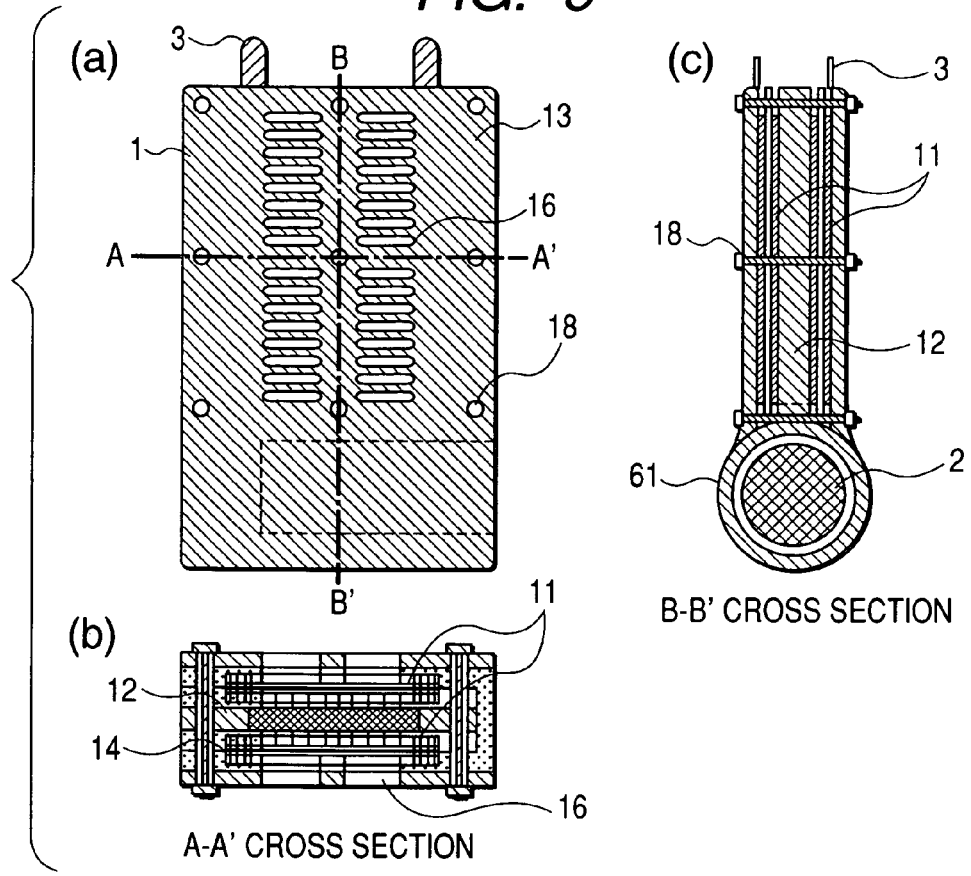
FIG. 9 comprises an external view and sectional views showing an example of a fuel cell according to the present invention.

FIG. 9 shows an external view (a), a sectional plan view (b) and a sectional side view (c) of a fuel cell power source according to the present invention. The fuel cell 1 comprises a fuel chamber frame 12, power generation devices 11 and cathode end plates 13 and is characterized by disposing the power generation devices on both the surfaces of the fuel chamber frame. A fuel suction structure 14 is contained in the fuel chamber frame 12, and a fuel cartridge holder 61 and a cartridge connector 25, which is not shown in the figure, are integrally contained in the fuel chamber frame 12. Another feature of the present example is that it is designed so that the air sufficiently diffuses toward the power generation devices 11 facing a floor even when the fuel cell is placed on the floor by increasing the diameters of the cylindrical fuel cartridge and the cartridge holder 61 larger than the thickness of the fuel cell.

Preparation of Metal Suction Material

Slurry is produced by mixing the solid matter comprising 20 vol % SUS316L fine powder 100 μm in average diameter pulverized by the water atomizing method and 80 vol % paraffin wax 1,000 μm in average diameter and the aqueous solution containing commercially available methyl cellulose by 3 wt % at the volume ratio of 6 to 4, and the produced slurry is poured into a mold and is left at rest for 24 hours. The compact is formed into a tabular shape at a pressure of 0.7 MPa and dried at 50° C. The obtained tabular compact is washed using n-hexane as the solvent and thus the paraffin wax particles in the tabular compact are dissolved and extracted.

The tabular compact is dried at 90° C., thereafter degreased for one hour at 600° C. in nitrogen atmosphere, and further sintered at 1,200° C. in vacuum, and thereby a suction material made of SUS316L is produced. As a result of examining it by the ordinary pore distribution evaluation method and scanning electron microscope observation, the obtained metal suction material is a porous material having the pore diameter distribution wherein two peaks exist at the pore diameters of 50 and 850 μm.

The fuel suction structure using the above SUS316L foam metal is an elastic body having an elastic limit of about 15 kg/cm², is designed so as to be compressed by about 50 μm when all of the battery constituent members are fixed with screws, and is configured so that a certain pressing pressure is compensated even when each battery member undergoes a pressing pressure of about 5 kg/cm² by the counterforce and some degree of creep deformation is caused at some portions of the battery constituent materials.

Preparation of MEA

An MEA composing a power generation device has the structure shown in FIG. 5(a), and a substance produced by using Ketjen Black (made by Lion Corporation) as the carbonaceous powder carrier and dispersing and supporting platinum and ruthenium so that the atomic ratio of the platinum to the ruthenium is 1 to 1.5 and the total weight ratio of the noble metals to the carbon carrier is 54% is used as the anode catalyst, and a substance produced by dispersing and supporting fine particles so that the weight ratio of the supported platinum to the carbonaceous carrier Ketjen Black (made by Lion Corporation) is 50% is used as the cathode catalyst. The MEA is produced by coating each of the electrode catalysts with paste wherein 20 wt % Nafion (made by Sigma-Aldrich Corporation) is used as the binder by the ordinary splaying method. The radius of the micro pores of the anode of the produced MEA distributes in the range from 1 to 30 μm and the average pore radius is about 20 μm.

The cathode and anode diffusion layers having the structures shown in FIGS. 5(b) and 5(c) are used. The content of PTFE (fluid dispersion D-1 made by Daikin Industries, Ltd. is used) in the carbon paper (TGP-H-060 made by TORAY) in the cathode diffusion layer is 20 wt %. The cathode diffusion layer is produced by: baking the carbon paper after containing the PTFE for 30 minutes at 360° C. in the air; coating one surface of the baked carbon paper with the slurry, which is produced by adding the fluid dispersion D-1 (made by Daikin Industries, Ltd.) as the binder to carbon powder (XC-72R made by Cabot Corporation) so that the PTFE content is 20 wt %, so that the thickness of the slurry coating is about 50 μm; drying them; and thereafter incinerating them at 360° C.

Meanwhile, the anode diffusion layer is produced so that the PTFE content in the carbon paper is 10 wt % and the PTFE content in the carbon powder layer is also 10 wt % by the method similar to the case of the cathode diffusion layer.

Preparation of Complex Collector

Figure 10:
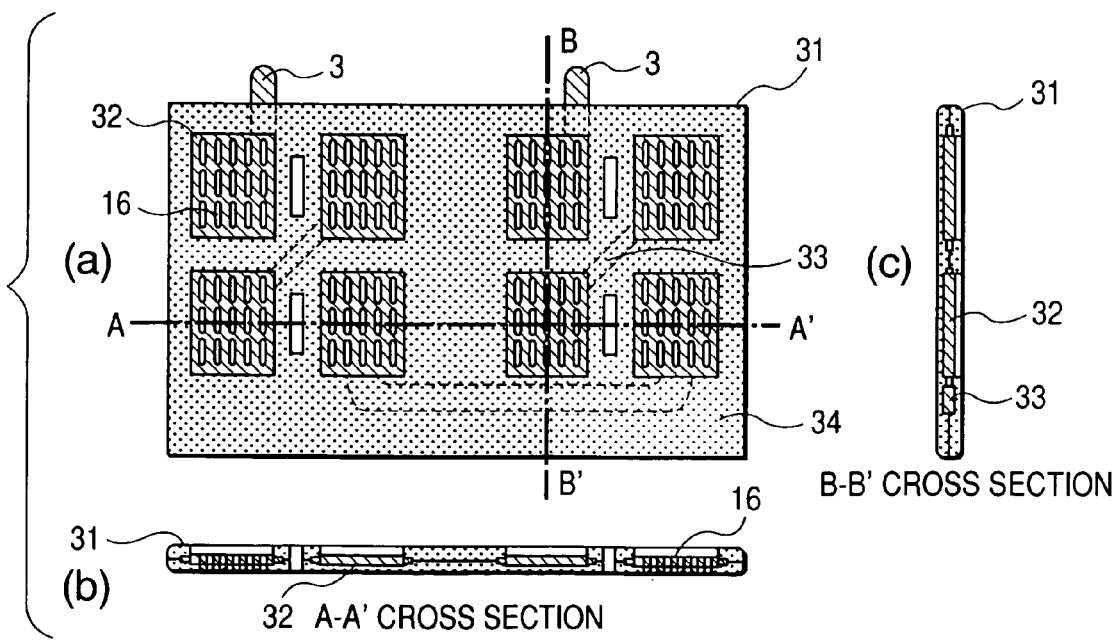
FIG. 10 comprises a plan view and sectional views showing the structure of a complex collector used in the present invention.

FIG. 10 shows the structure of a complex collector 31 composing a power generation device 11 according to the present invention, wherein (a) is a plane view, (b) a cross sectional view, and (c) another cross sectional view. The complex collector 31 is structured so that eight sheets of conductive collector plates 32 having the cathode slits 16 are closely attached to the resin film 34 having cathode slits 16 synchronizing with the slits 16 of the conductive collector plates 32 as shown in the sectional view taken on line A-A' in FIG. 10.

Each of the collector plates 32 is structured so that the interconnectors 33 and the output terminals 3 to supply electricity to outside are densely embedded so that four sheets of MEAs disposed on the surface are connected in series at the time of the assembly. Each of the collector plates 32 has the size of 16 mm×18 mm in conformity with the area of each of the power generation sections and is produced by using titanium 0.2 mm in thickness and directly coating the surface thereof with gold so that the thickness thereof is 0.5 μm without using abase material such as nickel. As the resin composing the complex collector 31, a polyimide film 0.2 mm in thickness is used.

Figure 11:
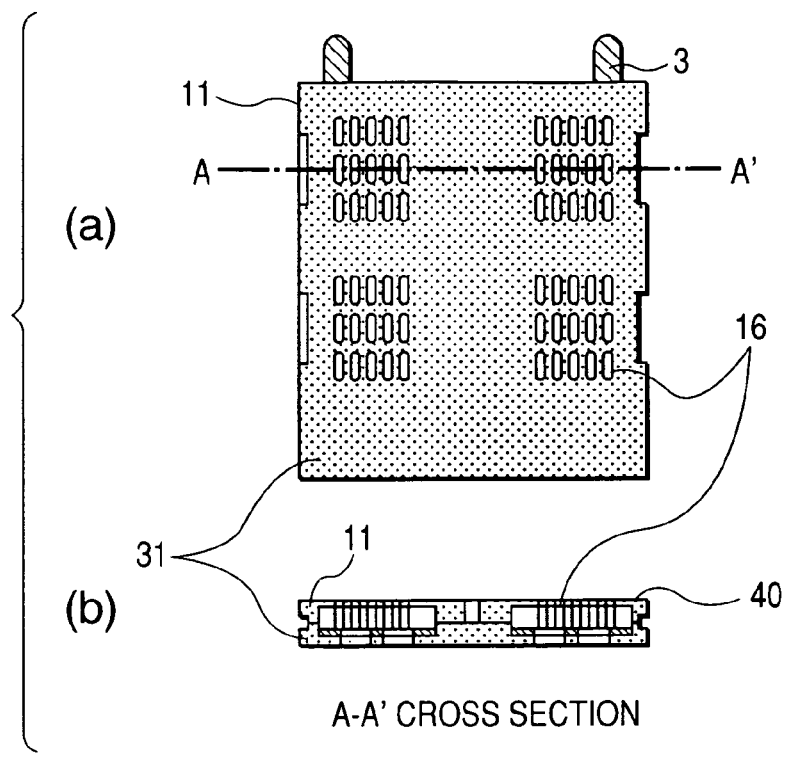
FIG. 11 comprises a plan view and a sectional view showing the structure of a power generation device used in the present invention.

FIG. 11 shows the configuration and sectional structure of a power generation device 11 comprising an MEA 40, a cathode diffusion layer 43c and an anode diffusion layer 43a which are prepared by the methods disclosed above, wherein (a) is a plane view and (b) a cross sectional view. Each of the diffusion layers is produced by coating the periphery of the electrode with the binder used for the preparation of the MEA beforehand and integrating them by cold pressing.

Figure 12:
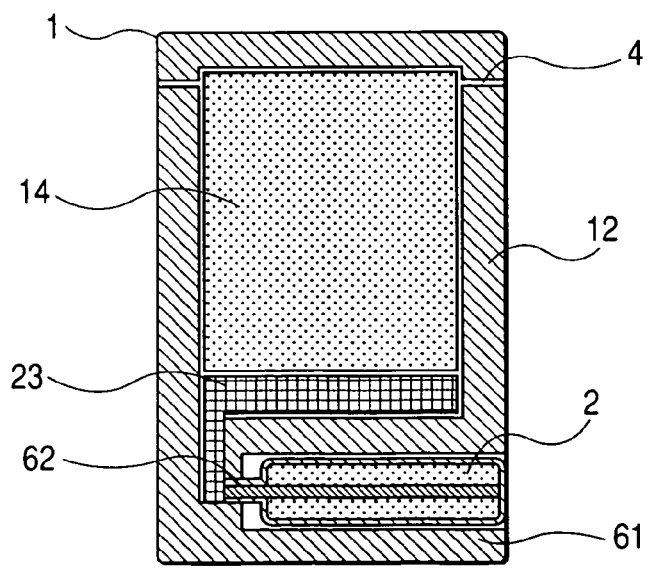
FIG. 12 is a sectional view showing the structure of the interior of. the fuel chamber of a fuel cell according to the present invention.

FIG. 12 shows a sectional front view of the fuel chamber section of the fuel cell 1 of the present example. The fuel chamber frame 12 is filled with a suction structure 14. In the fuel suction structure 14, a fuel feed channel is formed from the connection port of a fuel cartridge 2 by a transport center core 23. The fuel chamber frame 12 and a fuel cartridge holder 61 form an integrated structure. Further, pinholes 4, 0.5 mm in diameter, are formed at two portions of the fuel chamber frame and function as exhaust ports when the pressure in the fuel chamber is positive to the atmospheric air due to the carbon dioxide gas and water vapor generated by power generation, methanol vapor and the like.

Connector Structure

Figure 13A:
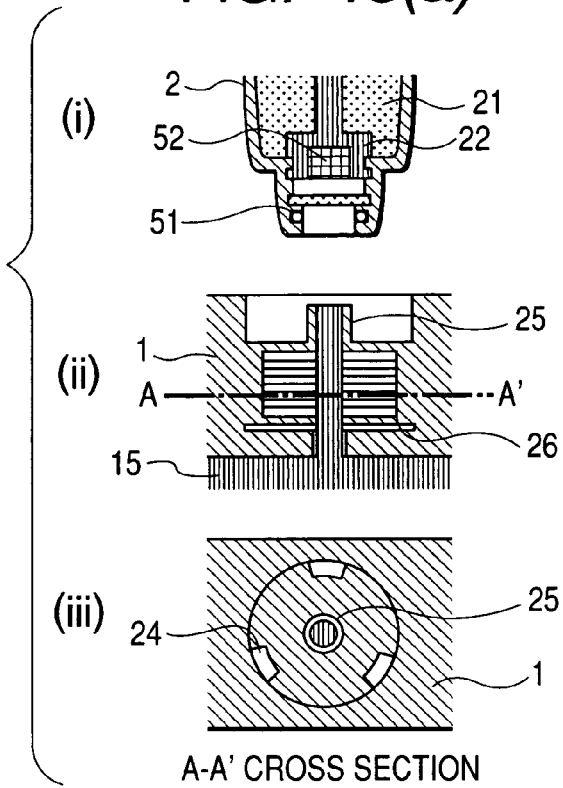
FIGS. 13(*a*) and 13(*b*) are sectional views and a sectional assembly view of a fuel cartridge connector according to the present invention.

FIG. 13(a) shows the outline of the structures of the male connector of the cartridge connector 25 and the female connector of the fuel cartridge 2 which are used for connecting the fuel cell 1 to the fuel cartridge 2 in the present example, wherein (i) in FIG. 13(a) shows a cross sectional view of the male connector, (ii) a cross sectional view of the female connector, and (iii) a cross sectional view of the female connector. The cartridge connector 25 is disposed at a part of the fuel chamber frame 12 of the fuel cell 1, and the transport center core 15 is connected to the fuel suction structure 14 as the male connector and performs the function of fuel transportation. The transport center core 15 is formed by bundling polypropylene fiber and the average radius of the capillary tubes formed among the fibers is about 180 μm. Further, a collector 26 having the function of air exchange is disposed at a part of the cartridge connector 25 and has: the function of controlling so as to continue the fuel transport by supplying the air when the internal pressure of the fuel cartridge 2 is negative in accordance with fuel consumption; and the function of preventing fuel from leaking outside the fuel cell 1 due to the change of internal pressure of the fuel cell or pressure caused by a shock and the like.

Meanwhile, the female connector formed on the side of the fuel cartridge 2 comprises the fuel transport center core 22 and a slit valve 51 and the tip of the female connector is filled with porous polyurethane foam having notches for the insertion of the male cartridge connector 25 as the auxiliary transport material 52 for stabilizing the junction with the transport center core 15 of the male connector on the side of the power generation. By so doing, it is possible to easily form a fuel feed channel between the male cartridge connector 25 and the fuel transport center core 22 disposed in the fuel cartridge 2 and thus decrease the fluid resistance at the time of fuel transportation.

Figure 13B:
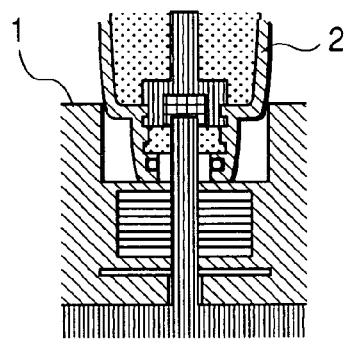

FIG. 13(b) shows the outline of a sectional structure when the fuel cartridge 2 is mounted on the fuel cell 1. When the fuel cartridge 2 is inserted into the cartridge connector 25 for mounting, the male cartridge connector 25 passes through the slit valve 51, is connected to the fuel transport center core 22 in the fuel cartridge through the auxiliary transport material 52 at the tip of the female connector in the cartridge, and forms the continuous fuel feed channel by the capillary force of the materials. The fuel is transported from the fuel cartridge 2 to the anode in the fuel cell 1 by the capillary negative pressure generated in accordance with the power generation of the battery.

The size of the power source thus produced is 115 mm×90 mm ×9 mm and, when the fuel cartridge filled with 30 wt % methanol aqueous solution is mounted and the power generation test is carried out at room temperature, the output is 2.4 V and 0.8 W. It is confirmed that the output of the power source does not change even when it is placed at any position by hand and the power generation can continue without causing the leakage of the liquid fuel even when it is shaken by hand.

The present example is a power generation device wherein plural membrane/electrode combined bodies are electrically aligned in series on an identical plane, and has the battery structure wherein a porous elastic body having two kinds of micro pores of different radii is interposed and supported as the fuel suction structure. The porous suction structure is connected to the fuel transport center core, has an air exchange section having a collector structure at an end of the center core, further forms a male connector, and is connected to the fuel cartridge.

By so doing, the structure is characterized in that the liquid feed channel of capillary tubes is formed continuously from the fuel cartridge to the anode, further micro pores which are not filled with liquid fuel exist in the fuel suction structure, and thereby the carbon dioxide gas generated in the vicinity of the anode is separated from the fuel and discharged from the pinhole disposed on the fuel chamber frame to the outside of the battery. The fuel feed channel is designed and arranged in order from the fuel cartridge to the electrode so that the average pore radius is about 180 μm in the case of the transport center core used in the fuel cartridge and the fuel chamber frame, about 50 μm in the case of the fuel suction structure, and about 20 μm in the case of the anode.

With regard to the gas generated in the fuel chamber, micro pores of 850 μm in radius which do not cause the clogging of 30 wt % methanol aqueous solution by capillary phenomenon are selected and the gas is exhausted from the exhaust pinhole 4 through the micro pores. As a result, the feed channel of the fuel liquid is not changed even when the position of the fuel cell is changed and the methanol fuel does not leak from the liquid retaining capillary tubes even when the fuel cell is strongly shaken by hand. This shows that the fuel cell can be operated stably in any position.

Further, it is not necessary to regulate the position and adopt a separation membrane mechanism as a gas-liquid separation mechanism for separating the fuel liquid and the generated gas and exhausting the gas, which has heretofore been essential. Then in the present example, the gas and liquid are separated by two kinds of micro pores and hence it is possible to: sufficiently reduce the sectional area of the exhaust port for the generated gas discharge up to about 2 mm or smaller though an area of 1 cm or more has been required in the conventional gas-liquid separation membrane mechanism; prevent unnecessary evaporation of the fuel; reduce the air diffusion into the fuel chamber; and thereby realize a system of a high fuel utilization ratio.

EXAMPLE 2

Structure of Battery

The fuel cell 1 according to the second example, though it is not shown in the figure, comprises a fuel chamber frame 12, a gasket 19, power generation devices 11 and cathode end plates 13 in the same manner as Example 1. A fuel suction structure 14 is contained in the fuel chamber frame 12. The fuel cell 1 is structured so that total twelve membrane/electrode combined bodies disposed on both the surfaces of the fuel chamber are connected in series and the major difference from the Example 1 is that this case employs the structure wherein the fuel cartridge 2 is contained in a fuel cartridge holder 61 disposed at the center portion of the fuel cell 1.

Figure 14:
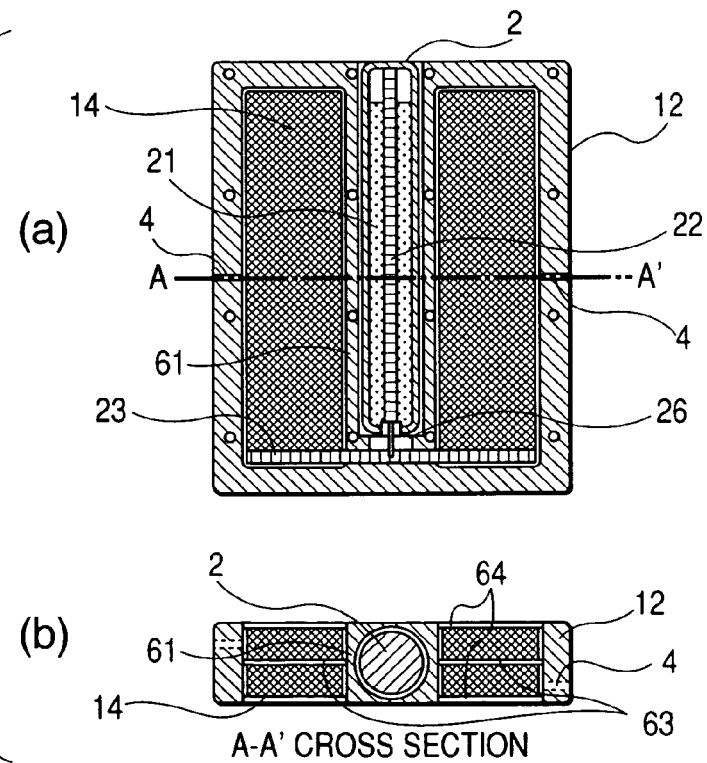
FIG. 14 comprises sectional views showing the structure of the interior of the fuel chamber of a fuel cell according to the present invention.

FIG. 14 shows the layout of components in the fuel chamber frame 12, wherein (a) is a plane view and (b) a cross sectional view. The interior of the fuel chamber frame is divided into two sections, a fuel suction structure 14 is contained in each of the two sections, and a fuel cartridge holder 61 and a male connector having a collector 26 having air exchange function are integrated at the center portion of the fuel chamber frame 12. A transport center core 15 with which the male connector is filled is connected to two sheets of fuel suction structures 14 and thus forms a fuel feed channel. An exhaust pinhole 4 is disposed at each of the two divided sections of the fuel chamber frame.

A fuel cartridge having the same structure as used in Example 1 is used. Further, as the fuel suction structures, porous bodies made of SUS316L which is the same material as used in Example 1 are used. The fuel cell 1 is structured so that MEAs are mounted on both the surfaces of each of the fuel suction structures 14 and the fuel suction structures 14 are electrically conductive, and hence porous insulation sheets 64 are placed as shown in the sectional view taken on line A-A' of FIG. 4 in order to avoid the short-circuiting of MEAs mounted on both the surfaces.

Further, In the present example, the power generation device 11 is structured so as to be disposed on both the surfaces of each of the fuel suction structures 14 and hence liquid short-circuiting caused by an ion-conductive material which is a reaction intermediate occurs between the power generation devices 11 on both the surfaces during power generation. For that reason, an insulation sheet 63 not having ion conductivity is placed between the sections of the fuel suction structure divided into two sections in the thickness direction.

The power generation device is structured so that six MEAs are connected in series on a plane, and interposed in and supported by a complex collector 31 in the same way as Example 1. The same collector plates, resin film composing the complex collector, anode diffusion layer and cathode diffusion layer as used in Example 1 are used. Further, a fuel cartridge, a connector structure, the collector structure forming an air exchange section, and a fuel transfer center core, those having the same specifications as Example 1, are used.

In the fuel cell of the present example. the average pore radius is 20 μm in the case of the anode, 50 μm in the case of the fuel suction structure, and 180 μm in the cases of the transport center core and the fuel transport center core used in the fuel cartridge, and the relation is arranged in the order so that the continuous fuel feed channel is easily formed by the capillary force. Further, in this case, the average radius of large caliber pores to exhaust vapor phase components in the fuel chamber is 850 μm and the clogging caused by the suction of liquid fuel does not occur.

The size of the power source of the present example is 120 mm×100 mm×15 mm and, when the fuel cartridge filled with 30 wt % methanol aqueous solution is mounted and the power generation test is carried out at room temperature, the output is 4.0 V and 1.28 W. In the power source, the lowering of power source voltage caused by liquid short-circuiting between MEAs by the ionic material existing in the fuel chamber does not substantially occur and the voltage of each of the MEAs is generally in the range of 0.33±0.02 even when a structure of extending a voltage terminal from each of the MEAs is used. It is confirmed that the output of the battery of the present example does not change even when the battery is placed at any position by hand and the power generation can continue without causing the leakage of the liquid fuel even when the battery is shaken by hand.

EXAMPLE 3

In the present example, the same fuel cell structure as Example 2 is employed and the present example is characterized in that, whereas the air exchange section 62 having the collector structure is formed on the cartridge connector 25 in Example 2, a male connector is formed on the side of the fuel cartridge 2, a collector-type air exchange section is formed in the connector, and thus a female connector is formed on the side of the fuel chamber frame 12.

Preparation of Ceramics Suction Material

The powder mixture of 15 vol % mullite powder 1 µm in average grain diameter, 10 vol % paraffin wax 180 µm in average grain diameter and 75 vol % paraffin wax 900 µm in grain diameter and 5 wt % aqueous solution of polyvinyl alcohol having an average molecular weight of 100,000 are mixed at the volume ratio of 6 to 4 and thus the slurry thereof is produced. The slurry is poured into a mold on a flat plate, frozen, and retained for 24 hours. The formed compact is dried for 2 hours at 50° C. in the air. Thereafter, the compact is washed with n-hexane solvent and thus the paraffin wax in the compact is removed. The obtained compact is degreased at 600° C., and thereafter incinerated for 3 hours at 1,250° C. in the air, and thus the ceramics suction material is produced. As a result of examining it by the ordinary pore distribution evaluation method and scanning electron microscope observation, the obtained material is a porous material having the pore diameter distribution wherein two peaks exist at the average pore diameters of 90 and 950 µm.

Figure 15:
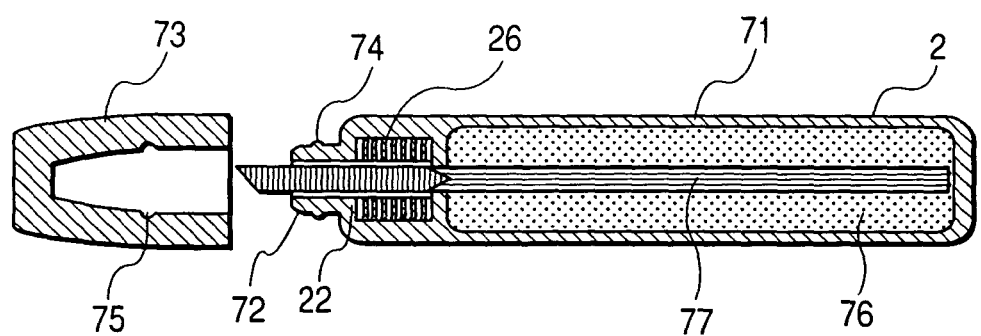
FIG. 15 is a sectional view showing a fuel cartridge used in a fuel cell according to the present invention.
Figure 16A:
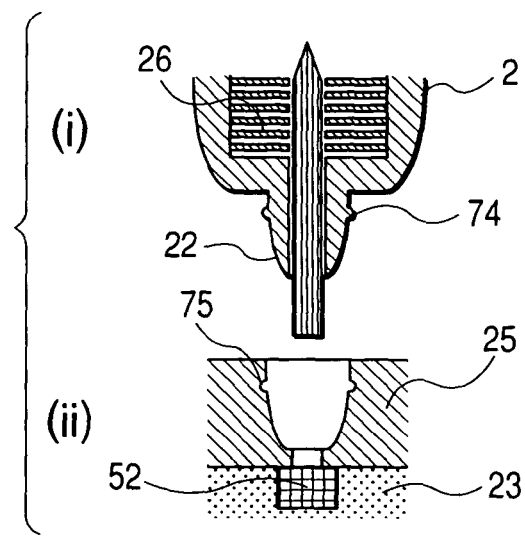
FIGS. 16(*a*) and 16(*b*) are a sectional view and a sectional assembly view of a fuel cartridge connector according to the present invention.
Figure 16B:
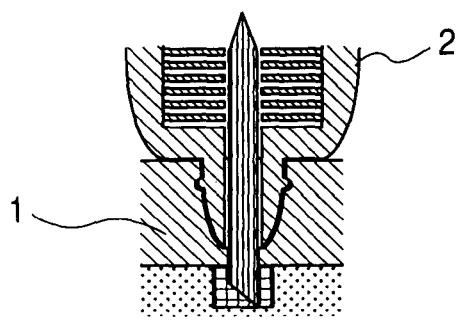

The sectional structure of the fuel cartridge adopted in the present example is shown in FIG. 15. The structure of the connection to the fuel cell 1 is shown in FIGS. 16A and 16B. The fuel cartridge 2 comprises at least two sections of the polypropylene made connector 72 and the liquid fuel retainer 71. The connector 72 comprises the air exchange section having the collector 26 and the polypropylene made fuel transport center core 22 having an average pore radius of 220 µm, which passes through the air exchange section. Another center core 77 connected to the fuel transport center core 22 is connected to the liquid fuel retainer 71.

The center core 77 is disposed so as to reach the other end of the liquid fuel retainer 71 and further surrounded by polypropylene made filling material 76 having a porosity rate of about 90 vol %, and the liquid fuel is kept therein. It is acceptable to supply fuel with only the fuel transport center core 22 without using the center core 77 but, by connecting the fuel transport center core 22 to the center core 77 and forming a fuel feed channel, the effect of making it possible to sufficiently use up the liquid fuel contained in the cartridge can be obtained.

A virgin fuel cartridge 2 is sealed with an ordinary airtight cap 73. In order to secure the airtightness of the cap 73, a ring-shaped protrusion 74 for fixing is formed on the connector 72 and a ring-shaped groove 75 for fixing is formed on the inner surface of the cap 73. When the fuel cartridge is used, the cap 73 is removed and the cartridge 2 itself is inserted into the cartridge holder 61. The female cartridge connector 25 of the cartridge holder 61 integrated into the fuel chamber frame 12 has a sealing section of the same structure as the fuel cartridge cap and is fixed in the cartridge holder 61 as the structure is shown in FIGS. 16(a) and 16(b). In FIGS. 16(a) and 16(b), (i) is a cross sectional view of a fuel cartridge, (ii) a cross sectional view of a connector. FIG. 16(b) shows a connected status of the cartridge and the fuel cell.

A used fuel cartridge is sealed with the aforementioned cap 73 and then recycled or discarded, and thereby it is possible to prevent remaining liquid fuel from leaking and to handle it safely.

The pores of the members which play the role of fuel transportation in the present example are configured as the combination of: the micro pores of 20 µm in average radius in the case of the anode; the liquid transport micro pores of 90 µm in radius in the case of the ceramics fuel suction material; the micro pores of 180 µm in average radius in the case of the transport center core; and the micro pores of 220 µm in radius in the case of the fuel transport center core.

Further, in this case, the average radius of large caliber pores for discharging vapor phase components in the fuel chamber is about 950 µm and clogging caused by the suction of liquid fuel does not occur. As a result of the combination, a liquid fuel feed channel is easily formed when a fuel cartridge is mounted, the operation of a fuel cell is started, and the power generation continues without leaking the liquid even when the position of the fuel cell is changed and the fuel cell is shaken by hand.

EXAMPLE 4

In the present example, a battery of the same structure as Example 1 is used. The present example is characterized in that a transparent polypropylene cartridge is used as the fuel cartridge 2 in the same way as Example 3 and the pigment Pigment Blue 15 is added by 1 ppm to 30 wt % methanol aqueous solution and the solution is colored blue.

The size of the power source thus produced is 115 mm×90 mm ×9 mm and, when the fuel cartridge filled with blue-colored 30 wt % methanol aqueous solution is mounted and the power generation test is carried out at room temperature, the output is 2.4 V and 0.8 W. By coloring fuel aqueous solution as stated above, it is possible: to clearly identify the fuel exclusively used for the fuel cell power source of the present example by the color; and thereby to manage so as not to cause wrong mounting or wrong usage. Further, the addition amount of pigment is very small, the pigment does not dissolve in the methanol aqueous solution, and the battery performance is the same as the case where pigment is not added. It is confirmed that the power source continues the power generation without changing the output even when the position is changed by hand and without leaking the liquid fuel even when the power source is shaken by hand.

What is claimed is:

1. A fuel cell comprising:
  a porous anode to oxidize liquid fuel;
  a cathode to reduce oxygen;
  a solid polymer electrolyte membrane formed between the anode and the cathode; and
  a porous body facing the porous anode, which has a first group of continuous micro pores having liquid retentivity for forming a liquid fuel supply channel and a second group of continuous micro pores having no liquid retentivity for forming a gas release channel from the anode;
  wherein the liquid fuel is supplied to the anode by capillary force generated at the anode, and
  wherein an average radius of the second group of the micro pores is larger than that of the first group of the micro pores, and the average radius of the second group of the micro pores is at least 500 µm.

2. A fuel cell according to claim 1, wherein said porous body is made of one or more materials selected from among metal, ceramics, and high polymer resin.

3. A fuel cell according to claim 1, wherein the capillary force $P_C$ of said continuous micro pores which form said liquid fuel feed channel in said porous material satisfies the following expression;

$$P_0 + \rho g h \leq P_C \leq P_A,$$

where, $P_0$ represents a pressure imposed from outside, $\rho$ the viscosity of said liquid fuel, g the gravity acceleration, h the head height of said liquid fuel retained in said porous body, and $P_A$ the capillary force of said porous anode.

4. A fuel cell according to claim 1, wherein the average pore radius $r_C$ of continuous micro pores which form a liquid fuel feed channel in said porous material satisfies the following expression;

$$2\sigma \cos\theta_C/(P_0+\rho g h) \geq r_C \geq r_A(\cos\theta_C/\cos\theta_A),$$

where, σ represents the interfacial tension of said liquid fuel, $\theta_C$ and $\theta_A$ the contact angle between said porous body and said liquid fuel and the contact angle between said anode and said liquid fuel, respectively, and $r_A$ the average pore radius of said anode.

5. A fuel cell comprising:
a porous anode to oxidize liquid fuel;
a cathode to reduce oxygen;
a solid polymer electrolyte membrane formed between the anode and the cathode;
a porous body facing the porous anode, which has a first group of continuous micro pores having liquid retentivity for forming a liquid fuel supply channel and a second group of continuous micro pores having no liquid retentivity for forming a gas release channel from the anode; and
an air exchange section having capillary force; wherein the liquid fuel is supplied to the anode by capillary force generated at the anode, and
wherein an average radius of the second group of the micro pores is larger than that of the first group of the micro pores, and
the average radius of the second group of the micro pores is at least 500 μm.

6. A fuel cell according to claim 5, wherein said air exchange section is made of a porous material.

7. A fuel cell according to claim 6, wherein the capillary force $P_C$ of said continuous micro pores which form said liquid fuel feed channel in said porous body satisfies the following expression;

$$P_F \leq P_C < P_A,$$

where, $P_F$ represents the capillary force of said micro pores in said air exchange section, and $P_A$ the capillary force of said anode.

8. A fuel cell according to claim 6, wherein the contact angle $\theta_C$ between said porous structure and said liquid fuel and the average pore radius $r_C$ satisfy either or both of the following expressions;

$$\theta_F = \theta_C > \theta_A, \theta_F \geq \theta_C > \theta_A,$$

$$r_F = r_C > r_A, r_F \geq r_C > r_A,$$

where, $\theta_F$ and $\theta_A$ represent the contact angle between said air exchange section material and said liquid fuel and the contact angle between said anode material and said liquid fuel, respectively, and $r_F$ and $r_A$ represent the average pore radius of said air exchange section and the average pore radius of said anode, respectively.

9. A fuel cell according to claim 5, wherein said air exchange section has a collector structure.

* * * * *